(12) United States Patent
Yamamoto et al.

(10) Patent No.: US 7,285,351 B2
(45) Date of Patent: Oct. 23, 2007

(54) APPARATUS FOR DILUTION OF DISCHARGED FUEL

(75) Inventors: Akio Yamamoto, Saitama (JP); Kazunori Fukuma, Saitama (JP); Takatsugu Koyama, Saitama (JP); Hideo Numata, Saitama (JP); Masahiro Matsutani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 539 days.

(21) Appl. No.: 10/676,470

(22) Filed: Oct. 1, 2003

(65) Prior Publication Data

US 2004/0062975 A1 Apr. 1, 2004

(30) Foreign Application Priority Data

Oct. 1, 2002 (JP) .............................. 2002-288890

(51) Int. Cl.
*H01M 8/04* (2006.01)
*H01M 2/12* (2006.01)

(52) U.S. Cl. ...................................... 429/34

(58) Field of Classification Search ............ 429/13–39; 366/101–107, 163.1, 336, 341
See application file for complete search history.

(56) References Cited

U.S. PATENT DOCUMENTS 6,065,961 A * 5/2000 Shaffer et al. ............... 431/328
6,237,336 B1 * 5/2001 Feucht et al. ............... 60/605.2
2002/0142200 A1 * 10/2002 Formanski et al. ............ 429/17
2004/0072052 A1 * 4/2004 Yamamoto et al. ........... 429/34
2004/0106021 A1 * 6/2004 Kanai et al. .................. 429/22

FOREIGN PATENT DOCUMENTS

JP 06-275300 9/1994
JP 2002-56864 2/2002

OTHER PUBLICATIONS

Japanese Office Action Application No. 2002-288890, dated Jan. 26, 2006.

* cited by examiner

*Primary Examiner*—Susy Tsang-Foster
*Assistant Examiner*—Alix Echelmeyer
(74) *Attorney, Agent, or Firm*—Lahive & Cockfield, LLP; Anthony A. Laurentano, Esq.

(57) ABSTRACT

An apparatus for dilution of discharged fuel of a fuel cell is provided, which has an inlet for guiding purged hydrogen gas coming from the fuel cell, a reservoir for storing the purged hydrogen gas guided through the inlet, and a cathode exhaust gas pipe penetrating the reservoir. The cathode exhaust gas pipe has a feature that it has holes inside the reservoir and is supplied with cathode exhaust gas of the fuel cell. Also the apparatus has a feature that the cathode exhaust gas pipe sucks the purged hydrogen gas stored in the reservoir through the holes and discharges the purged hydrogen gas diluted by mixing with the cathode exhaust gas.

13 Claims, 6 Drawing Sheets

APPARATUS FOR DILUTION OF DISCHARGED FUEL

FIELD OF THE INVENTION

The present invention relates to an apparatus for dilution of discharged fuel and more specifically to one used for purging operation of a fuel cell system with hydrogen gas, which is mounted on an electric vehicle as a power source.

BACKGROUND OF THE INVENTION

In a fuel cell system serving as a power source for an electric vehicle, which employs pure hydrogen gas (hereinafter referred to as hydrogen gas) for example, a circulation system for supplying the hydrogen gas has been selected so as to improve the fuel efficiency. Japanese Published Patent Application 6-275300 reports one example of this system. As a circulation method, an ejector which sucks hydrogen gas by negative pressure or a vacuum pump has been adopted.

Continuation of recirculation for hours in a circulation system sometimes causes a rise in the concentration of impurities in hydrogen gas such as nitrogen, thereby downgrading the efficiency of power generation. Also accumulation of water sometimes lowers the flow of hydrogen gas in an anode line of a fuel cell system. It is therefore necessary to conduct purging operation so as to discharge impurities such as nitrogen and water. It should be noted that the hydrogen gas of high concentration is discharged inevitably from the anode line filled with hydrogen gas during purging operation. This has posed a problem of safe hazard that the purged hydrogen gas is discharged directly into the open air.

In this connection, Japanese Published Patent Application 6-275300 does not disclose an idea that purged hydrogen gas should be discharged into the open air after undergoing a dilution process.

SUMMARY OF THE INVENTION

The object of the present invention is to provide an apparatus for dilution of discharged fuel, which has compact and simple structure for mixing purged hydrogen gas with cathode exhaust gas and is able to drain condensed water efficiently so as to maintain stable performance in terms of dilution.

An aspect of the present invention is to provide an apparatus for dilution of discharged fuel of a fuel cell, which has an inlet for guiding purged hydrogen gas coming from the fuel cell, a reservoir for storing the purged hydrogen gas guided through the inlet, and a cathode exhaust gas pipe penetrating the reservoir. The cathode exhaust gas pipe has a feature that it has holes inside the reservoir and is supplied with cathode exhaust gas of the fuel cell. Also the apparatus has a feature that the cathode exhaust gas pipe sucks the purged hydrogen gas stored in the reservoir through the holes and discharges the purged hydrogen gas diluted by mixing with the cathode exhaust gas.

The apparatus described above can make the purged hydrogen gas stay in the reservoir, which comes from an anode line and enters the reservoir via the inlet, thereby preventing the purged hydrogen gas from being directly discharged into the open air. The purged hydrogen gas, which is sucked through the holes of cathode exhaust gas pipe and mixed with the cathode exhaust gas flowing through the cathode exhaust gas pipe, is diluted substantially and thereafter discharged into the open air. In this way, the concentration of purged hydrogen gas discharged into the open air can be controlled to be as low as a desirable value. The whole apparatus can also be configured to be compact and simple.

Another aspect of the present invention is to provide an apparatus for dilution of discharged fuel, which has a feature that an inlet and holes are adapted to be spatially apart each other.

The apparatus described above, which has the inlet of reservoir adapted to be apart from the holes of a cathode exhaust gas pipe for mixing purged hydrogen gas, diffuses the purged hydrogen gas efficiently in the reservoir, thereby increasing the time period of purged hydrogen gas staying in the reservoir before discharge. In this way, the mixture of purged hydrogen gas and cathode exhaust gas is improved and thereby dilution can be performed adequately.

Still another aspect of the present invention is to provide an apparatus for dilution of discharged fuel, which has features that a cathode exhaust gas pipe is adapted to bend downward and holes for draining water are provided in a lower portion of the bent portion of cathode exhaust gas pipe.

When purged hydrogen gas which is diluted by mixing with cathode exhaust gas in the cathode exhaust gas pipe is discharged into the open air, the apparatus described above sucks condensed water collected at the bottom of a reservoir. In this way, the apparatus, which applies the stream of cathode exhaust gas to discharging, can drain the condensed water efficiently which affects dilution adversely.

Yet another aspect of the present invention is to provide an apparatus for dilution of discharged fuel, which has a feature that a cross section of the bent portion of a cathode exhaust gas pipe is adapted to be smaller.

The apparatus described above, which has a smaller portion of the cathode exhaust gas pipe, increases the speed of cathode exhaust gas there, decreasing the pressure accordingly. In this way, condensed water, which is sucked into the cathode exhaust gas pipe more efficiently through holes provided in the bent portion, can be discharged into the open air, being assisted by the high-speed stream of cathode exhaust gas.

A further aspect of the present invention is to provide an apparatus for dilution of discharged fuel, which has a feature that a collector for condensed water contained in purged hydrogen gas is provided around the bent portion of a cathode exhaust gas pipe at the bottom of a reservoir.

The apparatus described above can efficiently suck the condensed water, which has accumulated in the collector provided at the bottom of reservoir, through holes of the cathode exhaust gas pipe for draining water. In this way, the apparatus can drain the condensed water into the open air adequately.

A still further aspect of the present invention is to provide an apparatus for dilution of discharged fuel, which has a feature that the apparatus includes a plurality of means for collecting hydrogen gas from an anode line of a fuel cell.

The apparatus described above can collectively treat the purged hydrogen gas as well as water generated in a fuel cell stack and a humidifier. In this way, the apparatus provides an efficient dilution system, allowing a compact and lightweight box of fuel cell system.

DESCRIPTION OF THE PREFERRED EMBODIMENTS

Embodiments of an apparatus for dilution of discharged fuel according to the present invention are now described referring to the accompanying drawings.

Figure 1:
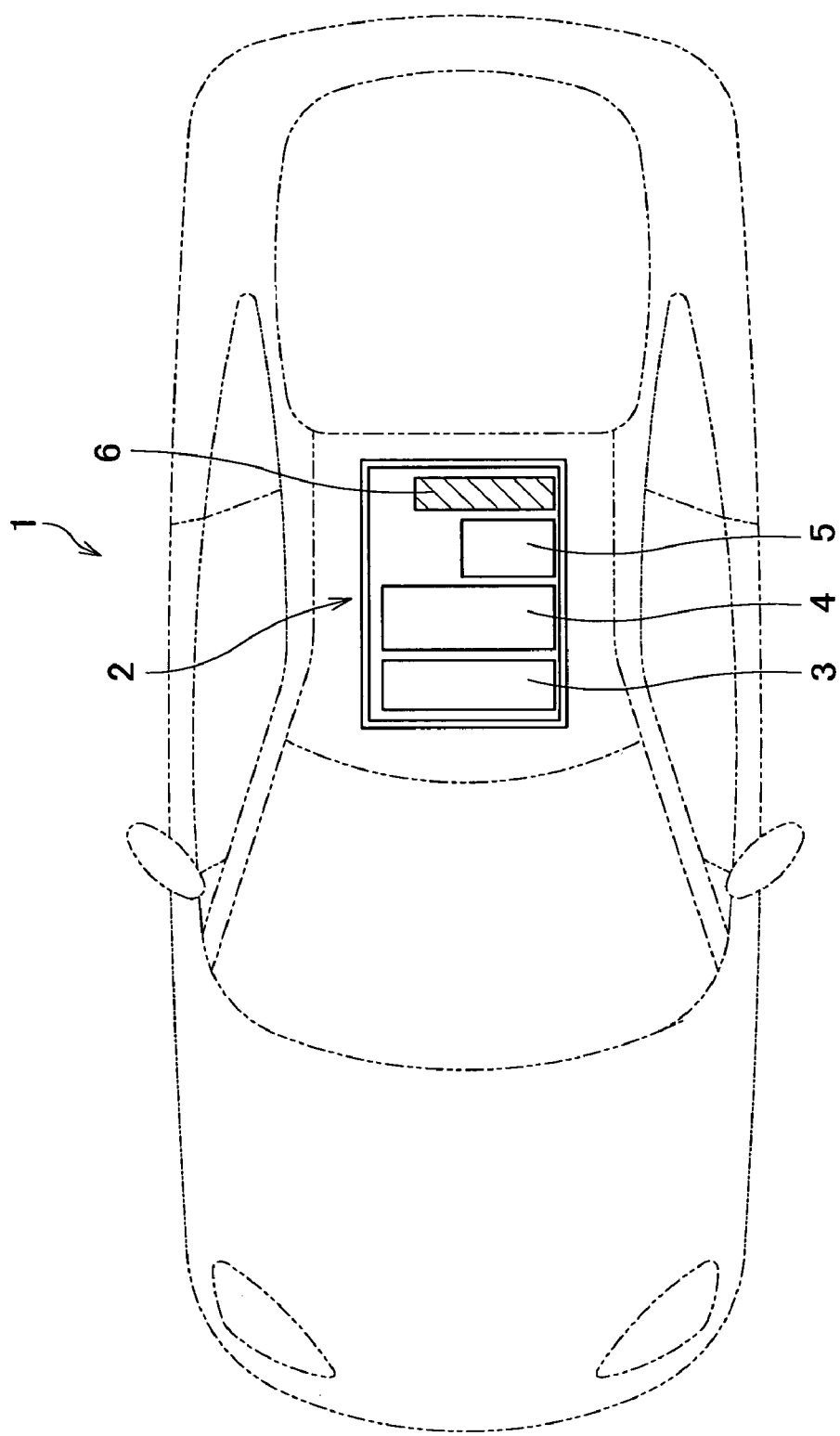
FIG. 1 is a schematic diagram illustrating the layout for a box of fuel cell system, which includes an apparatus for dilution of discharged fuel of the present invention.

As shown in FIG. 1, an electric vehicle 1 with a fuel cell system (hereinafter referred to as a vehicle) has a box 2 of fuel cell system approximately under the middle of floor. In the box 2, a fuel cell system is installed, which includes a temperature controller 3, a fuel cell stack 4, a humidifier 5 and an apparatus 6 for dilution of discharged fuel placed in this order from the front to rear of vehicle 1. The fuel cell system further includes a radiator (not shown) for cooling the fuel cell stack 4 and a highly pressurized container (not shown) of hydrogen gas.

The fuel cell stack 4, which is supplied with hydrogen gas stored in the container and air taken from the outside, generates electricity for driving the vehicle 1. The temperature controller 3 controls the temperatures of hydrogen gas and air supplied to the fuel cell stack 4 and the humidifier 5 humidifies them so that the fuel cell stack 4 can operate efficiently. The apparatus 6 for dilution of discharged fuel makes purged hydrogen gas stay inside, which comes from an anode line, and dilutes the purged hydrogen gas by mixing with cathode exhaust gas, thereby discharging the diluted mixture into the open air.

Figure 2:
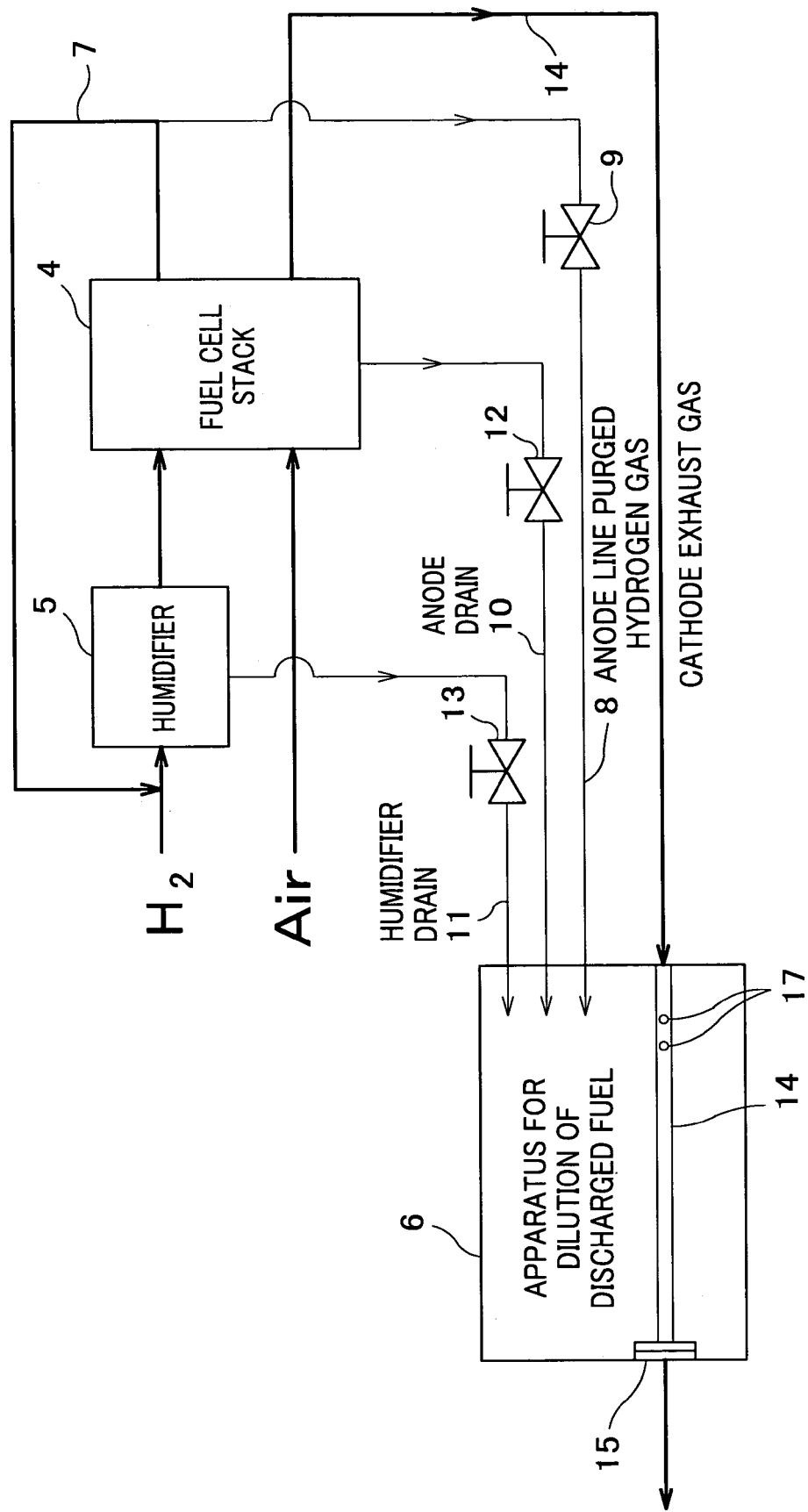
FIG. 2 is a block diagram illustrating an apparatus for dilution of discharged fuel of the present invention.

As shown in FIG. 2, the hydrogen gas used in the fuel cell stack 4 is recirculated to the upstream of humidifier 5 through a pipe 7. The hydrogen gas recirculated for a long period of time will increase the concentration of impurities or contain water. A pipe 8 for purged hydrogen gas branched from the pipe 7 is connected to the apparatus 6 so as to purge the hydrogen gas and water. The pipe 8 has a valve 9, which is operated automatically or manually. The valve 9 is normally closed but opened when a purge is executed.

An anode drain pipe 10 for discharging a drain of an anode electrode of fuel cell stack 4 as well as a humidifier drain pipe 11 for discharging the other drain of humidifier 5 are connected to the apparatus 6. The anode drain pipe 10 and humidifier drain pipe 11 have valves 12 and 13 respectively, which are automatically or manually operated.

A cathode exhaust gas pipe 14 is connected to the apparatus 6 so as to discharge exhaust gas released from the fuel cell stack 4.

Since the volume of purged hydrogen gas increases after being discharged into the apparatus 6, the purged hydrogen gas stays in the apparatus 6 and is diffused. The purged hydrogen gas is then sucked through holes 17 of the cathode exhaust gas pipe 14, which runs inside the apparatus 6 and has a flow of cathode exhaust gas. The purged hydrogen gas, which is subsequently diluted by mixing with the cathode exhaust gas and results in low concentration of hydrogen, is discharged into the open air. The apparatus 6 also discharges condensed water generated in the humidifier 5 and fuel cell stack 4. The apparatus 6 has a back-fire protection filter 15.

Figure 3:
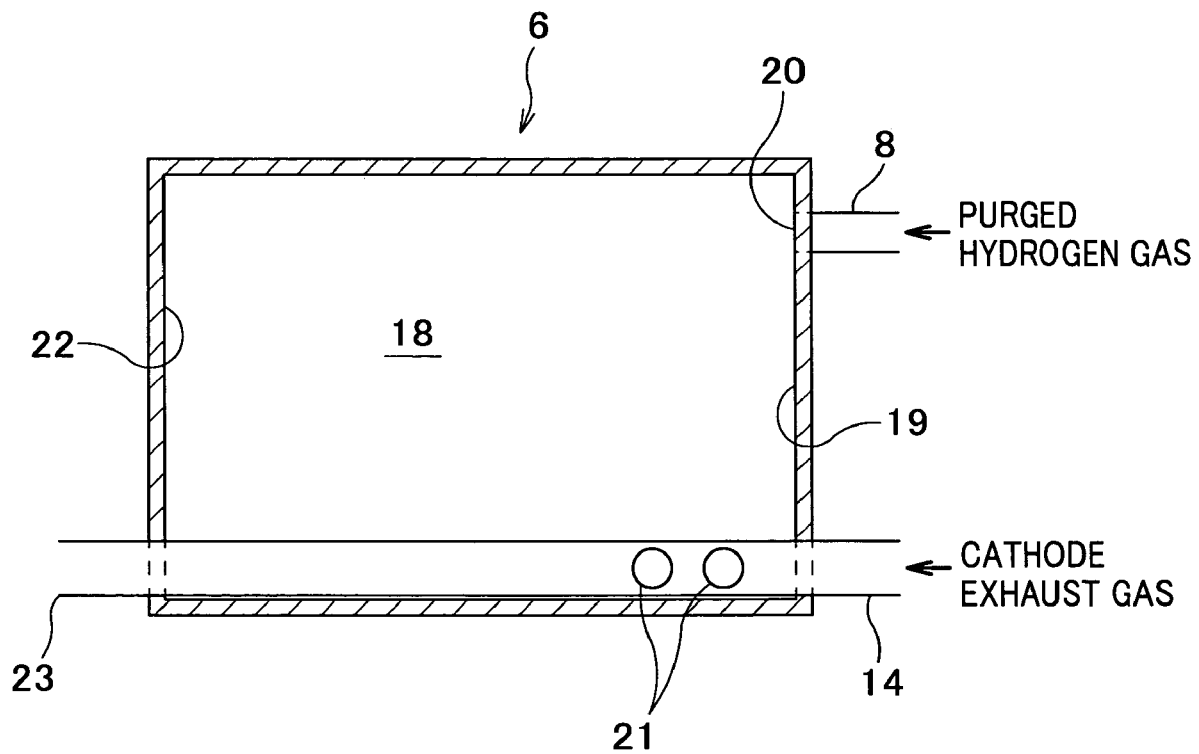
FIG. 3 is a cross sectional view showing an apparatus for dilution of discharged fuel according to a first embodiment of the present invention.

A first embodiment of an apparatus for dilution of discharged fuel according to the present invention is described referring to FIG. 3.

An apparatus 6 for dilution of discharged fuel is a box-like container and has an inlet 20 at a higher portion of a wall 19, through which purged hydrogen gas coming via a pipe 8 for purged hydrogen gas (FIG. 2) enters the apparatus 6. The inside of apparatus 6 is used as a reservoir 18 for the hydrogen gas coming through the inlet 20.

A cathode exhaust gas pipe 14, through which cathode exhaust gas coming from a cathode line flows, penetrates horizontally from the wall 19 to a wall 22 at a lower portion of the apparatus 6 and has an outlet 23 communicating with the open air. The cathode exhaust gas pipe 14 has holes 21, which are located near the wall 19 having the inlet 20. The number of holes 21, which in the present embodiment is selected to be two taking into account the efficiency of suction, may be changed to another number as required.

Using the apparatus 6 for dilution of discharged fuel according to the first embodiment, the hydrogen gas of high concentration, which is discharged from an anode line into the reservoir 18 via the pipe 8, stays longer in the reservoir 18 and increases in volume. This will prevent the purged hydrogen gas from being discharged immediately. Though the purged hydrogen gas staying in the reservoir 18 is mixed with new purged hydrogen gas coming through the inlet 20, the hydrogen gas weighing lighter tends to collect in an upper section of the reservoir 18. In this way, the concentration of hydrogen gas contained in the purged hydrogen gas occupying a lower section of the reservoir 18, where the cathode exhaust gas pipe 14 is disposed, is lower than that of the upper section. The purged hydrogen gas of lower concentration is sucked into the cathode exhaust gas pipe 14 through the holes 21, in which cathode exhaust gas with high speed and low pressure is running. The purged hydrogen gas is then mixed with the cathode exhaust gas and discharged into the open air through the outlet 23, under assistance of the stream of cathode exhaust gas. In this way, the purged hydrogen gas is diluted substantially before it is discharged into the open air.

As described above, the present embodiment, which discharges the purged hydrogen gas of low concentration at the lower section of reservoir 18, can better lower the concentration of hydrogen gas discharged into the open air.

Furthermore, the embodiment, which executes dilution for the purged hydrogen gas in the cathode exhaust gas pipe 14 without a dedicated chamber for mixing purged hydrogen gas with cathode exhaust gas, enables a compact and simple apparatus for dilution of discharged fuel.

Figure 4:
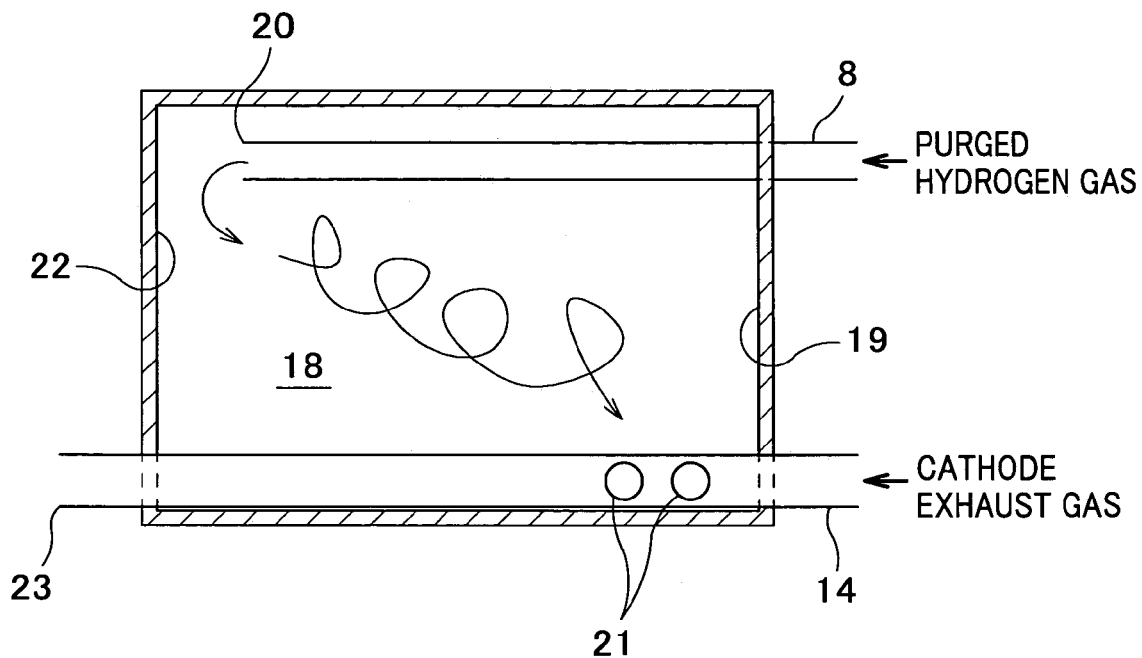
FIG. 4 is a cross sectional view showing an apparatus for dilution of discharged fuel according to a second embodiment of the present invention.

A second embodiment of an apparatus for dilution of discharged fuel according to the present invention is described referring to FIG. 4. Description for items which are the same as those of the first embodiment would be omitted, bearing the same symbols.

An apparatus 6 for dilution of discharged fuel has a pipe 8 for purged hydrogen gas, which extends into a reservoir 18 so that an inlet 20 at an end of the pipe 8 and holes 21 are adapted to be spatially apart.

The apparatus 6 of the second embodiment, in which the inlet 20 and holes 21 are adapted to be spatially apart each other, helps purged hydrogen gas coming into the reservoir 18 to diffuse before it is sucked through the holes 21. In this way, the purged hydrogen gas experiences dilution by expansion and collects in the reservoir 18, resulting in an increase of pressure. A cathode exhaust gas pipe 14, in which the pressure of cathode exhaust gas is lower due to high speed thereof (Bernoulli's theorem), sucks the purged hydrogen gas through the holes 21 and discharges it into the open air mixing with the cathode exhaust gas. The purged hydrogen gas substantially diluted this way, which has low concentration of hydrogen gas, is thus discharged through an outlet 23 into the open air.

Figure 5:
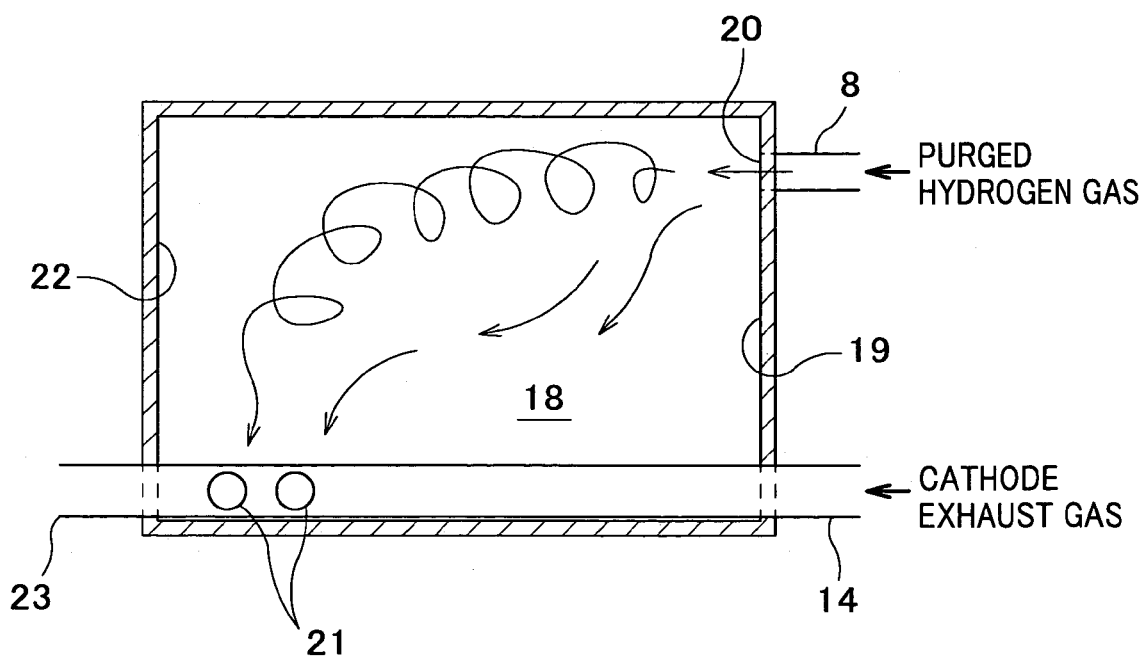
FIG. 5 is a cross sectional view showing an example of modification for the apparatus according to a second embodiment of the present invention.

FIG. 5 is a cross sectional view showing an apparatus for dilution of discharged fuel, an example of modification for the second embodiment. In this example, an inlet 20 of pipe 8 for purged hydrogen gas is placed on a wall 19 and holes 21 are located near a wall 22, so that the inlet 20 and holes 21 are adapted to be spatially apart each other.

In the example of modification, purged hydrogen gas, which comes into a reservoir 18 through the inlet 20, is diffused substantially in the reservoir 18 and sucked into a cathode exhaust gas pipe 14 through the holes 21. Subsequently, the purged hydrogen gas mixed with cathode exhaust gas is discharged into the open air. In this way, an apparatus 6 for dilution of discharged fuel makes the purged hydrogen gas stay in the reservoir 18 for a substantially long period of time, thereby discharging the purged hydrogen gas of low concentration into the open air through an outlet 23.

Figure 6:
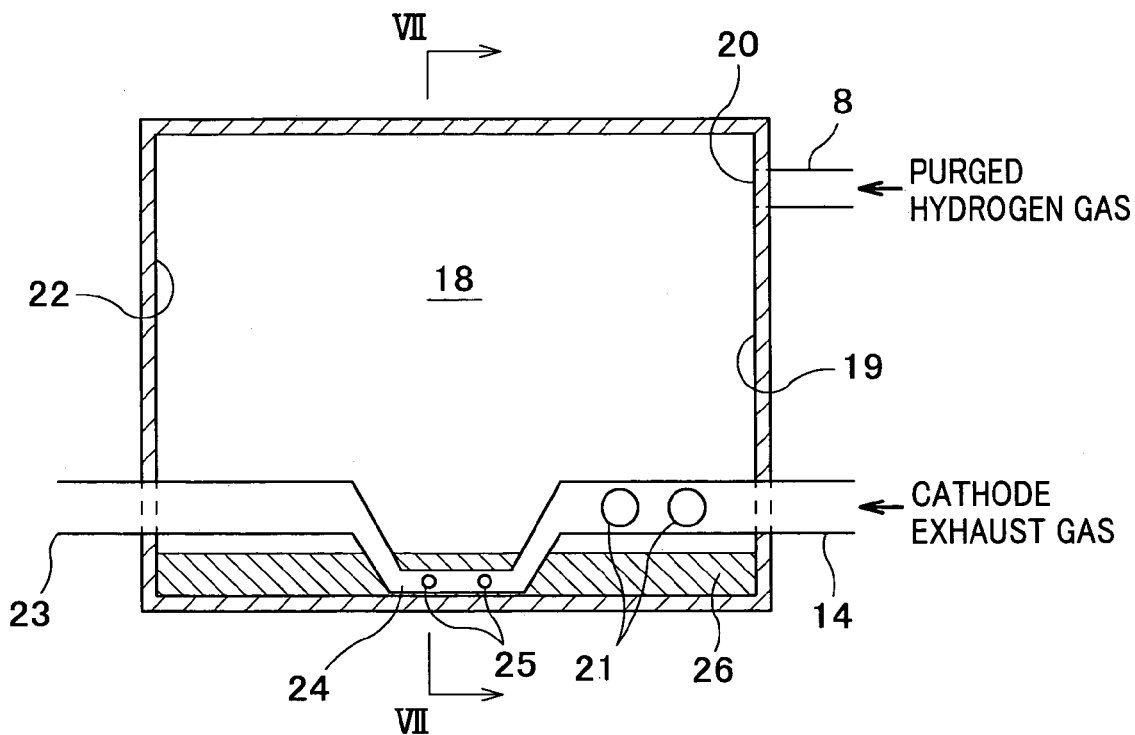
FIG. 6 is a cross sectional view showing an apparatus for dilution of discharged fuel according to a third embodiment of the present invention.
Figure 7:
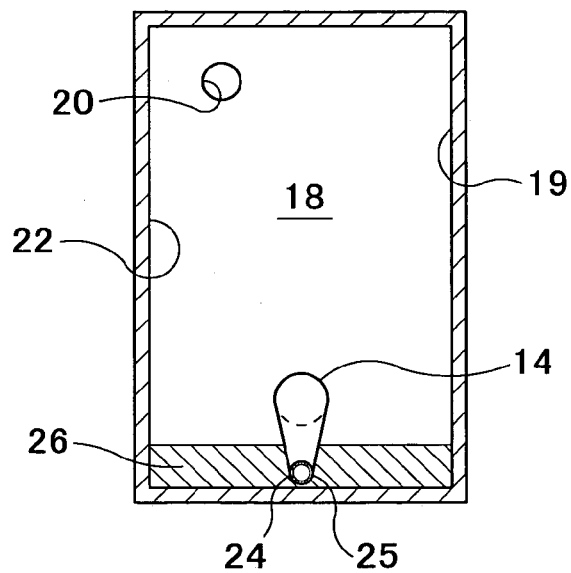
FIG. 7 is a view showing a section taken along line VII-VII in FIG. 6.

An apparatus for dilution of discharged fuel according to a third embodiment is described referring to FIGS. 6 and 7.

Description for items which are the same as those of the first embodiment would be omitted, bearing the same symbols.

An apparatus 6 for dilution of discharged fuel has a horizontal portion 24 with drain holes 25, which has a smaller cross section and is located at the bottom of bent portion of a cathode exhaust gas pipe 14. In this connection, the number of drain holes 25, which is selected to be two in the present embodiment taking into account the efficiency of drain, may be changed to another number as required.

Condensed water 26 accumulated at the bottom of a reservoir 18, which is contained in purged hydrogen gas discharged into the apparatus 6 through a pipe 8 for purged hydrogen gas, is sucked through the drain holes 25 into the cathode exhaust gas pipe 14, in which cathode exhaust gas running faster causes a pressure drop. In this connection, the condensed water 26 includes water generated by electro chemical reaction between hydrogen and oxygen and the like. Consequently, it is possible to suck the condensed water 26 into the cathode exhaust gas pipe 14, which causes degradation of dilution, and to discharge the condensed water 26 into the open air efficiently, under assistance of the stream of cathode exhaust gas.

Figure 8:
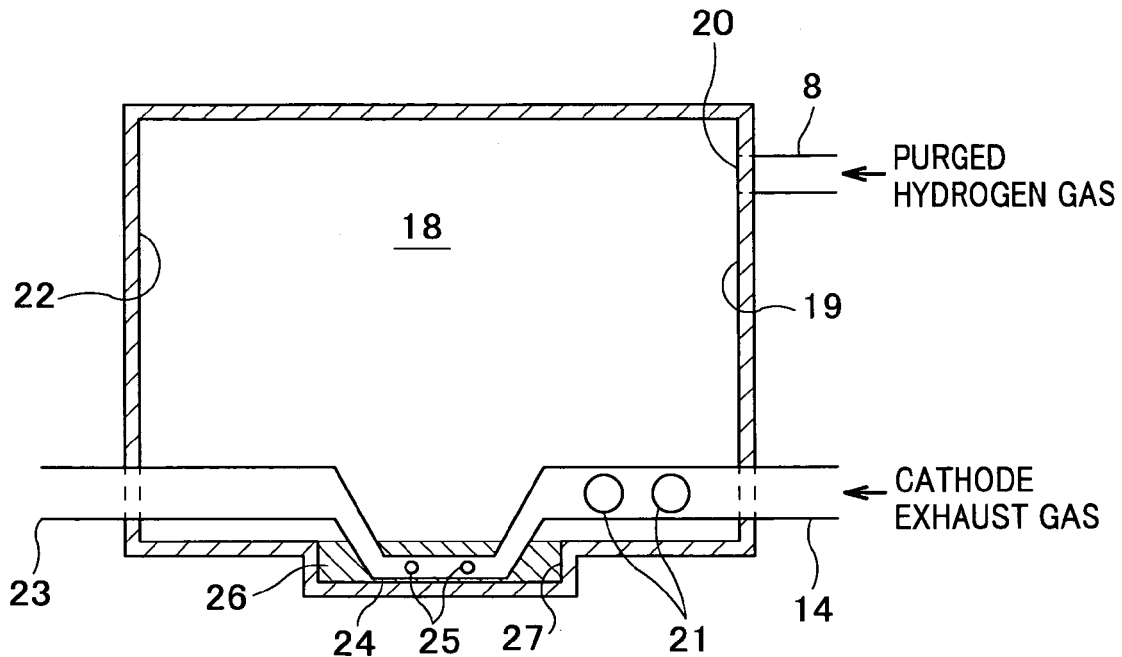
FIG. 8 is a cross sectional view showing an apparatus for dilution of discharged fuel according to a fourth embodiment of the present invention.

An apparatus for dilution of discharged fuel according to a fourth embodiment is described referring to FIG. 8. Description for items which are the same as those of the first embodiment would be omitted, bearing the same symbols.

An apparatus 6 for dilution of discharged fuel has a collector 27 for condensed water, which is a recess at the bottom of a reservoir 18 around a horizontal portion 24 of a cathode exhaust gas pipe 14. Drain holes 25 of the cathode exhaust gas pipe 14 are adapted to place in a lower portion of the collector 27 for condensed water. Condensed water 26 accumulated in the collector 27 is sucked into the cathode exhaust gas pipe 14 through the drain holes 25 and discharged into the open air, being carried by cathode exhaust gas. The apparatus 6 collects the condensed water 26 contained in purged hydrogen gas into the collector 27, thereby discharging the condensed water 26 into the open air efficiently.

Figure 9:
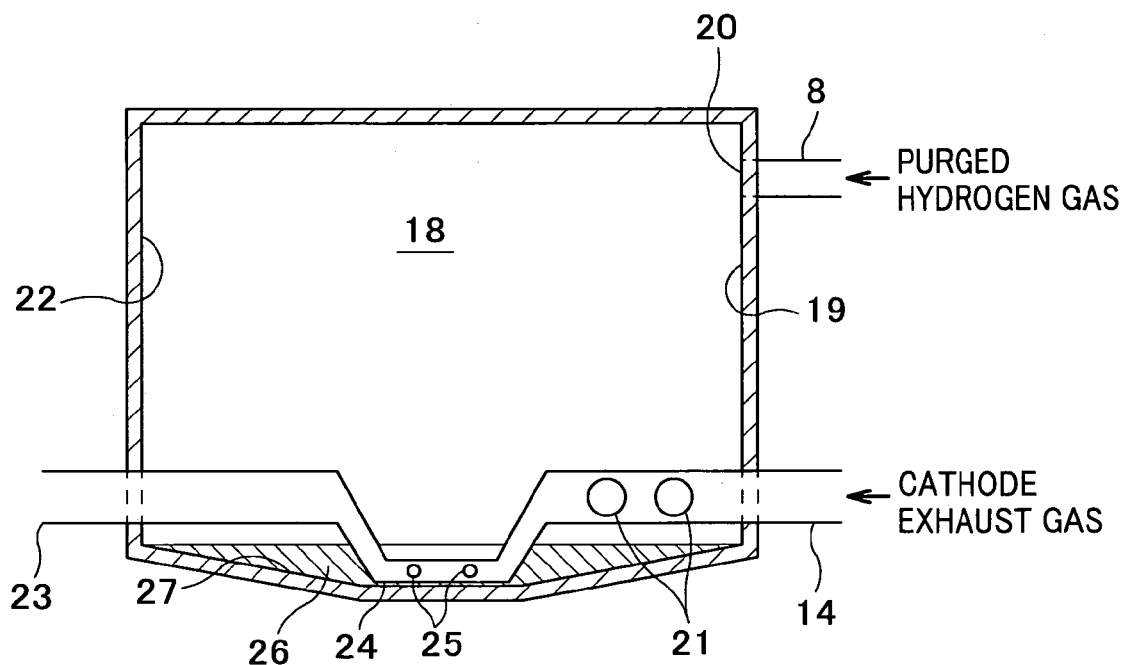
FIG. 9 is a cross sectional view showing an example of modification for the apparatus according to a fourth embodiment of the present invention.

FIG. 9 is a cross sectional view showing an apparatus for dilution of discharged fuel, an example of modification for the fourth embodiment. In this example, the bottom of an apparatus 6 for dilution of discharged fuel is tailored so that it has downward slopes starting from walls 19 and 22 respectively, having a horizontal section between them. In this way, it is possible to achieve a larger collector 27 for condensed water. Drain holes 25 of a cathode exhaust gas pipe 14 are adapted to lie in a lower portion of the collector 27. This example is also able to achieve the same effect as that of the fourth embodiment.

Condensed water collected in a fuel cell stack 4 and a humidifier 5 as well as purged hydrogen gas originating in an anode circulation line will affect generation of electricity by a fuel cell adversely. Therefore, it is necessary to discharge the condensed water as well, which requires discharging of hydrogen gas. The apparatus 6 for dilution of discharged fuel can collectively discharge the hydrogen gas, decreasing concentration of hydrogen gas to solve a problem of safety hazard.

What is claimed is:

1. An apparatus for dilution of discharged fuel of a fuel cell comprising:
   a hydrogen gas inlet for guiding purged hydrogen gas coming from the fuel cell;
   a reservoir for storing the purged hydrogen gas guided through the inlet, wherein the reservoir has one or more walls and wherein the hydrogen gas inlet is formed in the wall of the reservoir; and
   a cathode exhaust gas pipe penetrating through the wall of the reservoir at a first location to form an exhaust gas inlet and penetrating through the wall at a second location to form an exhaust gas outlet, wherein the cathode exhaust gas pipe has holes formed therein that communicate with an inside of the reservoir, wherein the cathode exhaust gas pipe is adapted to carry cathode exhaust gas generated by the fuel cell,
   wherein the cathode exhaust gas pipe sucks the purged hydrogen gas, which is introduced through the inlet and stored in the reservoir, through the holes and discharges the purged hydrogen gas diluted by mixing with the cathode exhaust gas.

2. An apparatus according to claim 1 wherein the hydrogen gas inlet and the holes are adapted to be spatially separated from each other.

3. An apparatus according to claim 1 wherein the cathode exhaust gas pipe has an intermediate portion that is bent to form a bent intermediate portion between the exhaust gas inlet and the exhaust gas outlet, and wherein at least a portion of the holes are formed in the bent intermediate portion of cathode exhaust gas pipe.

4. An apparatus according to claim 3 wherein a cross section of the bent intermediate portion of the cathode exhaust gas pipe has a diameter that is smaller than the diameter of a non-bent portion of the cathode exhaust gas pipe.

5. An apparatus according to claim 3 further comprising a collector disposed within the reservoir and adjacent the bent intermediate portion of the cathode exhaust gas pipe for collecting condensed water contained in the purged hydrogen gas.

6. An apparatus according to claim 1, further comprising a plurality of means for collecting hydrogen gas from an anode line of the fuel cell.

7. An apparatus according to claim 1, wherein the reservoir comprises a box-like housing having a plurality of walls, and wherein the cathode exhaust gas pipe penetrates a first wall of the plurality of walls at one end of the housing to form the exhaust gas inlet, and penetrates an opposed wall at the opposite end of the housing to form the exhaust gas outlet.

8. An apparatus according to claim 7, wherein the box-like housing has a substantially rectangular shape.

9. An apparatus according to claim 7, wherein one wall of the plurality of walls of the box-like housing comprises a plurality of linear interconnecting wall portions.

10. An apparatus according to claim 7, wherein the exhaust gas inlet and the exhaust gas outlet are formed, in one orientation, at the same vertical position so as to allow the cathode exhaust gas pipe to pass horizontally through the reservoir.

11. An apparatus according to claim 7, wherein the exhaust gas inlet and the exhaust gas outlet are formed; in one orientation, at a lower portion of the reservoir and the hydrogen gas inlet is disposed at an upper portion of the reservoir.

12. An apparatus according to claim 3, wherein at least a portion of the holes are formed in a non-bent portion of the cathode exhaust gas pipe.

13. An apparatus according to claim 1, wherein the hydrogen gas inlet and the exhaust gas inlet are formed in the same wall of the reservoir.

* * * * *